N. W. BUCH.
ELECTROPLATING APPARATUS.
APPLICATION FILED JUNE 23, 1913.

1,168,281.

Patented Jan. 18, 1916.
2 SHEETS—SHEET 1.

WITNESSES

INVENTOR

N. W. BUCH.
ELECTROPLATING APPARATUS.
APPLICATION FILED JUNE 23, 1913.
1,168,281.
Patented Jan. 18, 1916.
2 SHEETS—SHEET 2.
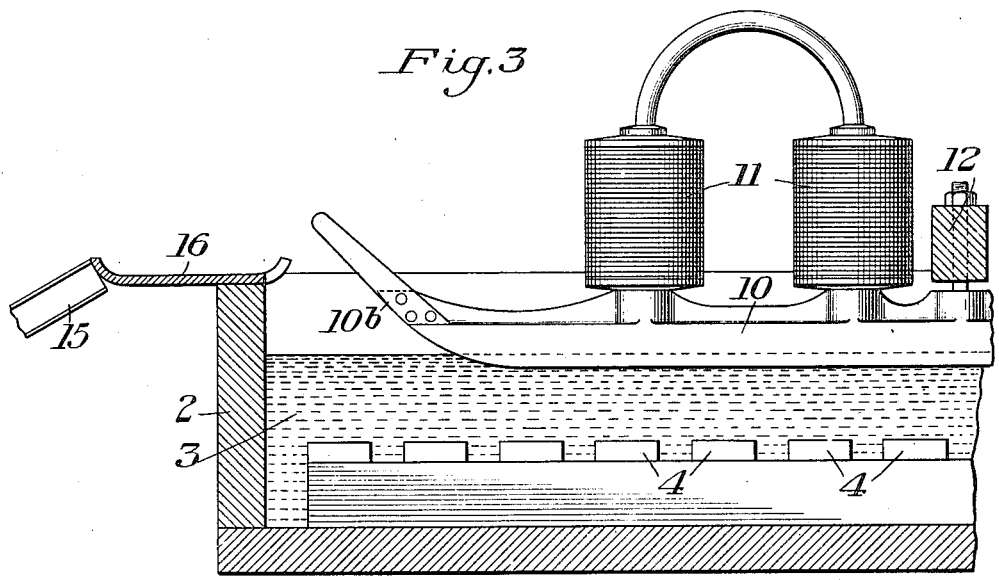
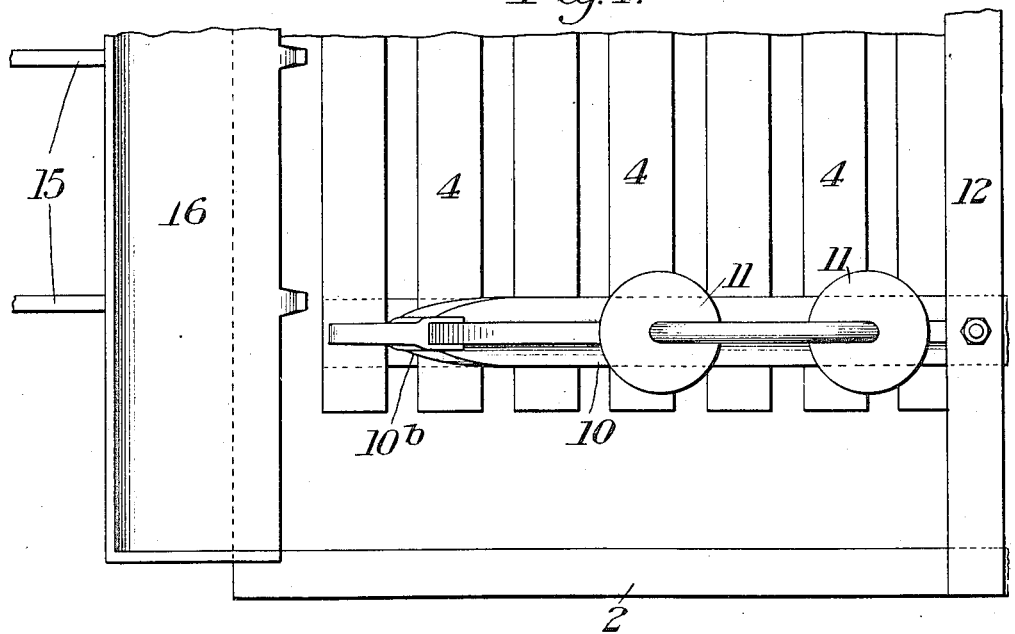

UNITED STATES PATENT OFFICE.

NEWTON W. BUCH, OF NEW CASTLE, PENNSYLVANIA, ASSIGNOR TO SAFETY ARMORITE CONDUIT COMPANY, OF PITTSBURGH, PENNSYLVANIA, A CORPORATION OF PENNSYLVANIA.

ELECTROPLATING APPARATUS.

1,168,281.  Specification of Letters Patent.  Patented Jan. 18, 1916.

Application filed June 23, 1913. Serial No. 775,251.

*To all whom it may concern:*

Be it known that I, NEWTON W. BUCH, a citizen of the United States, residing at New Castle, Lawrence county, Pennsylvania, have invented a new and useful Improvement in Electroplating Apparatus, of which the following is a full, clear, and exact description, reference being had to the accompanying drawings, forming part of this specification, in which—

Figure 1:
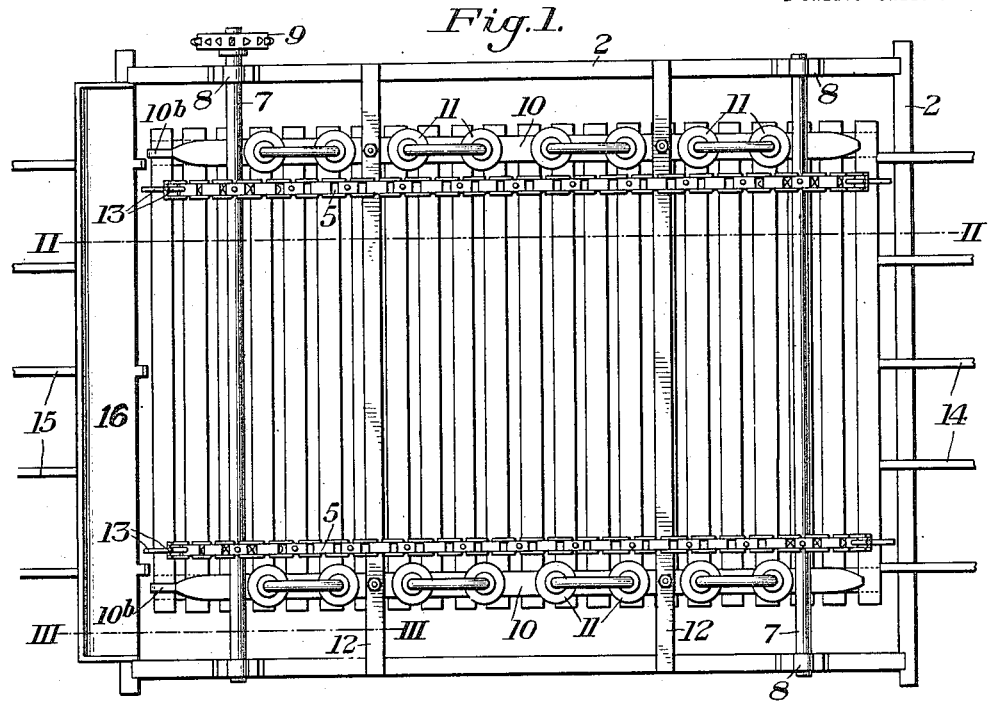
Figure 2:
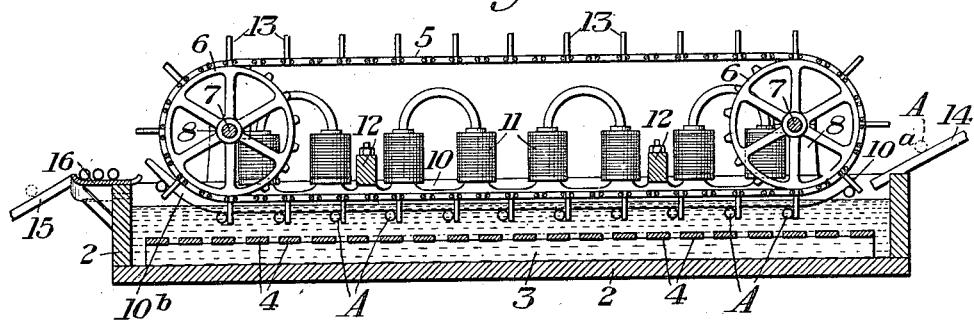

Figure 1 is a plan view of one form of apparatus embodying my invention; Fig. 2 is a longitudinal section on the line II—II of Fig. 1; Fig. 3 is a section of a portion of the apparatus on a larger scale, the section being taken on the line III—III of Fig. 1; Fig. 4 is a plan view of the portion of the apparatus shown in Fig. 3.

My invention has relation to electroplating apparatus, particularly designed for electro-galvanizing pipes, rods, or other long slender metal articles, although it may be used for a variety of electroplating operations.

The object of my invention is to provide apparatus of this character by means of which electro-galvanizing or other electroplating operations may be rapidly and conveniently carried out, the invention providing means whereby the operation may be a continuous one.

The nature of my invention will be best understood by reference to the accompanying drawings, in which I have shown the preferred embodiment thereof, and which will now be described, it being premised, however, that various changes can be made in the details of construction and arrangement of the parts without departing from the spirit and scope of the invention as defined in the appended claims.

In these drawings, the numeral 2 designates a suitable tank or vessel containing the electrolyte 3.

4 designates a series of transversely arranged anode members supported within the electrolyte in the lower portion of the tank.

5 designates endless conveyer chains, two in number, one of these chains being arranged for longitudinal travel at each side portion of the tank. These chains are carried and driven by the sprocket wheels 6 on transverse shafts 7, which are journaled in suitable bearings 8 on the tank. One of these shafts may be driven by any suitable means, such as the sprocket wheel 9.

Supported above each end portion of the anode members 3, and outside of the adjacent conveyer 5, is a longitudinally extending cathode member 10. These cathode members extend below the surface of the electrolyte, and also form pole pieces for a series of electro-magnets 11 secured thereto. These cathode members may be supported in any suitable manner, as by means of cross bars 12 which rest on the sides of the tank.

The conveyer chains 5 are so mounted that their lower portions will travel over the surface of the electrolyte and a short distance above such surface. Each conveyer is provided with a plurality of spaced pins or projections 13, which are of a sufficient length to extend into the electrolyte to a point somewhat below the bottom surfaces of the cathode members 10.

14 designates a suitable chute or skid at one end of the tank, by means of which the pipes or other articles to be coated are introduced therein; and 15 is a delivery skid or chute at the opposite end portion of the tank.

16 is a transversely arranged drainage trough adjacent to the upper end of the skid 15.

The end portions of the cathode members 10 are preferably curved upwardly as shown at $10^a$ and $10^b$ for the purpose hereinafter described.

The operation is as follows:—The pipes or other objects to be coated (and shown at A) are successively rolled on the skid 14 into the tank and into the electrolyte, where they are immediately attracted by the upwardly turned end portions $10^a$ of the magnetized cathode members. They are also engaged by the pins or studs on the conveyer chains, and by means of the latter are moved through the electrolyte, while at the same time they are held in suspension by the magnetic action of the said cathode members. When the pipes or other articles arrive at the opposite end portion of the tank, and the plating operation is completed, they are lifted out of the electrolyte by following the upwardly curved end portion $10^b$ of the cathode members and are discharged by the pins of the conveyer into the drainage trough 16 after they have been lifted clear of said members by the pins.

The advantages of my invention result from the provision of apparatus of a simple and efficient character, whereby the operation is a continuous one. It will be noted that the magnetized cathodes serve to hold the articles in spaced relation while they are moving through the electrolyte, thus bringing the electrolyte into contact with the entire surface of each article. As the pipes move along the surfaces of these cathode members, they roll to a greater or less extent so that there are no contacting surfaces which are not at some time during the operation exposed to the electrolyte. This rotation of the articles while passing through the bath is also of advantage in securing a better and more uniform coating. The upturning of the magnetized cathode members at their delivery end also forms, in connection with the conveyer chains, simple and effective means for lifting and discharging articles from the tank. No other special mechanism is required for this purpose.

I claim:

1. Electroplating apparatus, comprising a tank or vessel for the electrolyte, anode members therein, a cathode member supported above the anode members in position to leave a passage between the anode and cathode members for the articles to be coated, means for magnetizing the cathode members, and conveyer means for engaging and moving the articles through the electrolyte while they are suspended from above by the cathode members and at a distance from the anode members, substantially as described.

2. Electroplating apparatus having a cathode member extending longitudinally within the electrolyte above and at a distance from an anode member, and means whereby the articles to be coated are moved through the electrolyte at the under side of the cathode member while suspended therefrom, the space below the articles being unobstructed to the passage of current to the articles, substantially as described.

3. Electroplating apparatus having a cathode member extending longitudinally within the electrolyte, magnets for magnetizing the cathode member, and means for moving the articles to be coated through the electrolyte while they are held in contact with the under side of the cathode member, substantially as described.

In testimony whereof, I have hereunto set my hand.

NEWTON W. BUCH.

Witnesses:
RICHARD F. DANA,
NEVA B. MOORE.